US007162642B2

(12) United States Patent
Schumann et al.

(10) Patent No.: US 7,162,642 B2
(45) Date of Patent: Jan. 9, 2007

(54) DIGITAL CONTENT DISTRIBUTION SYSTEM AND METHOD

(75) Inventors: Robert Wilhelm Schumann, Oakton, VA (US); Richard Whittemore, Herndon, VA (US); David Mosche Goldschlag, Silver Spring, MD (US); David William Kravitz, Fairfax, VA (US); Siu-Leong Iu, San Jose, CA (US); Guillaume Mercier, McLean, VA (US); Michael Bergeron, Poway, CA (US); Jack Ehrhardt, Richmond, VA (US); Richard Vitkus, Richmond, VA (US)

(73) Assignee: Digital Video Express, L.P., Richmond, VA (US)

( * ) Notice: Subject to any disclaimer, the term of this patent is extended or adjusted under 35 U.S.C. 154(b) by 928 days.

(21) Appl. No.: 09/880,856

(22) Filed: Jun. 15, 2001

(65) Prior Publication Data

US 2002/0021805 A1    Feb. 21, 2002

Related U.S. Application Data

(63) Continuation of application No. PCT/US00/00077, filed on Jan. 5, 2000.

(60) Provisional application No. 60/144,833, filed on Jan. 6, 1999.

(51) Int. Cl.
*H04L 9/32* (2006.01)

(52) U.S. Cl. .................... 713/189; 713/193; 713/176; 726/26; 726/27; 726/30

(58) Field of Classification Search ........ 380/200–203, 380/209–210, 227–229, 233, 241, 26, 54, 380/55; 713/160–161, 169–170, 176, 189, 713/193, 200–202; 725/25, 93, 104, 143–146; 705/57–59; 726/26, 27, 30
See application file for complete search history.

(56) References Cited

U.S. PATENT DOCUMENTS

| 5,796,829 | A  | * | 8/1998 | Newby et al. ................. 705/54 |
| 6,266,415 | B1 | * | 7/2001 | Campinos et al. .......... 380/247 |
| 6,530,021 | B1 | * | 3/2003 | Epstein et al. .............. 713/176 |
| 6,628,891 | B1 | * | 9/2003 | Vantalon et al. .............. 386/94 |

* cited by examiner

*Primary Examiner*—Hosuk Song
(74) *Attorney, Agent, or Firm*—David G. Grossman

(57) ABSTRACT

A content distribution system and method which prevents unauthorized access to secured content such as movies and music. The apparatus includes a source, a receiver, an authorized security device such as a conditional access module (CAM) for decrypting authorized content, an output device for outputting content and a backend for managing accounts and system operations. One aspect of this invention provides a mechanism for providing secured content on a medium such as a DVD optical disc. These devices may verify that there is authorization to play the secured content, add watermarks to the secured content, convert the secured content to a displayable form and provide a means for preventing output of the secured content.

31 Claims, 5 Drawing Sheets

DIGITAL CONTENT DISTRIBUTION SYSTEM AND METHOD

This application is a continuation of international application number PCT/US00/00077, filed on Jan. 5, 2000, which claims the benefit of Provisional Application No. 60/144,833, filed Jan. 6, 1999.

FIELD OF THE INVENTION

The present invention relates to a secure content distribution system and method. More particularly, the present invention relates to a secure digital content distribution system and method for preventing unauthorized access to said content. More particularly still, the present invention relates to a content protection architecture that may be used to provide for conditional access of data and entertainment products such as movies and music.

BACKGROUND OF THE INVENTION

Preventing unauthorized access to digital content is an important problem in numerous applications. The present invention broadly relates to and provides a solution to this problem. In some commercial applications, where the content includes, for example, valuable audio or video content, unauthorized access by those who obtain the content may tend to reduce the profit margin of the content provider(s), who typically provide the content, e.g. to various listener and/or viewers, for a fee. In particular, with the advent of high definition video, this problem is even more serious because the digital data is of sufficient resolution to be shown on a full size theater screen. This opens up a whole new area for content pirates to market their stolen property. While the description which follows may sometimes be described in the context of audio/video/data as an example of content to be provided, the invention is not so limited and may equally to any type of information or content data from any source, including without limitation audio and/or video data or other type of data or executables. If the unauthorized accesser is a content pirate, he or she may pose a serious threat to a content provider by inducing others to pirate the content as well. More particularly, the pirate may generally sell pirated access to the content at a lower cost than the legitimate content provider because the pirate obtains access to the content by using the legitimate provider's infrastructure and therefore does not have to invest resources to produce and disseminate the content. This becomes even a greater concern where the pirate may copy and mass produce a relatively inexpensive component which allows a large number of users to obtain access to the content without authorization by the legitimate content provider. As a result, content providers have resorted to increasingly expensive and complex schemes to prevent unauthorized access to their information and content, i.e. to prevent pirating.

The present application is directed to the same general technology as copending commonly assigned patent application Ser. No. 09/253,013, entitled "Information Access Control System and Method" naming Goldshlag et al. as inventors (the contents of which are incorporated by reference herein). The present application presents a more complete architecture and method for content distribution. The present invention, while employing many common encryption/decryption techniques with Ser. No. 09/252,013, provides a more comprehensive overall architecture and methodology for securely managing content from content authoring to ultimate display.

One plan for controlling access to content involves the use of an IRD (integrated receiver device) with smart cards as a security module. This plan was proposed by Fiat and Schamir in a paper titled "How To Prove Yourself: Practical Solutions To Identification And Signature Problems" The Weizmann Institute of Science, Rehovot Israel (1986), and involves the use a trusted center to encode a smart card with personal information and secret values relating to the access. The smart card proves its identify to a verifier (IRD) which in turn must have knowledge of the secret values used to place the information onto the smart card. While the Fiat-Schamir plan is designed to make it difficult to forge personal information of one card, it does not prevent mass distribution of the forged card when and if the pirate has broken the smart card secrets used to prove identity. Also see, U.S. Pat. No. 4,748,688 to Schamir.

Another approach is described in U.S. Pat. No. 5,481,609 to Cohen et al., which uses a smart card in a system for controlling access to broadcast transmissions. Cohen uses a verifier function in an IRD to authenticate the authenticity of a smart card, a secret-learning operation, and a blacklisting operation that prevents previously detected illegal cards from gaining access. However, as indicated by the presence of the blacklisting operation, the system proposed in Cohen et al. can talk to any smart card that is not on the blacklist, and is thus susceptible to a pirated card (or a plurality of pirated cards) that has not yet been blacklisted. Furthermore, the verification process proposed by Cohen et al. is triggered by the broadcast source. Thus, a pirate could simply remove the verification commands from the broadcast stream thereby circumventing the verification process altogether. Another practical problem resulting from use of the broadcast source to trigger the verification process is an architectural one whereby what should be a local level decision (when and whether to challenge a smart card) is turned into a system level decision. Finally, the verification process in Cohen et al. is not tied to the transaction between the smart card and the verifier. Thus, a pirate could use a legitimate card for access authentication, i.e., to authenticate its right to access the content of the broadcast, and then use a pirated card to avoid being billed for the access, i.e. to avoid recording that the access was actually made by the legitimate card holder. This type of pirating is referred to herein as an example of a type of attack known as a conduit attack.

Another security approach is described in U.S. Pat. No. 5,461,675 to Diehl et al., which proposes to relate data between successive data packets, thus detecting when a packet has been removed. Particularly, Diehl et al. propose to inform a legitimate smart card when it is being avoided. However, a pirated card could simply ignore such information and provide pirated access to the content.

In yet another approach, proposed in U.S. Pat. No. 5,778,068 to Johnson et al., a determination is made whether a processing device and a user device, which contains a storage device, are authorized to operate with each other. The Johnson et al. approach determines whether a user device, in this case, a device which generally corresponds to a set top box, is valid by authenticating the user device to a provider device, in this case, a device which generally corresponds to a backend module. However, this approach does not determine if the provider device is valid, i.e. if the provider device is authorized to operate with the user device or with a provider device. Accordingly, a pirate who successfully reverse engineers and modifies the provider device could overcome the security protocols in Johnson et al., and more importantly, could mass-produce the pirated provider device for distribution to and by users.

Another approach is proposed in U.S. Pat. No. 5,825,876 to Peterson, Jr. Peterson authorizes access through a smart card that delivers key content to a processor that allows a playback device to reproduce content from a recording medium. The system proposed by Peterson uses a public key held at an authorization center and a private key held by the card. However, there is no pairing operation between the card and the processor, and there is no shared secret key between the card and the processor. Therefore, if a pirate successfully broke the encryption mechanism he/she could mass-produce and widely distribute pirated cards, causing harm to the content provider.

Another approach is proposed in U.S. Pat. No. 5,448,045 to Clark, which uses a smart card to create a secure boot application on a computer by using the smart card to verify the executable files that the computer will run. The smart card and the computer share a secret that is installed by an administrator and the smart card and the computer executes an authentication operation. However, once an attacker figures out the code, the pirated smart card would be able to authenticate itself. Furthermore, since there is no notion of challenge to the card by the computer, the authentication is replayable. Therefore, a card that is no longer valid may continue to be used.

Finally, another approach proposed in U.S. Pat. No. 5,802,176 to Audebert, controls access to a particular function on a computer by using a renewable card. This is a transaction based system in which the card and the computer negotiate access and a key changes each time access occurs. However, this approach is limited to the particular function which is to be accessed on the computer, and is not useful for a system which deals with many different unpredictable functions/programs such in an information dissemination system, i.e. a system in which each different program (movie, song, article, executable, etc.) would be a different function.

What is needed is a system and method for protecting valuable content; a method and system which is robust, which may be tailored to the needs of a particular content provider, and which overcomes the above noted deficiencies.

SUMMARY AND OBJECTS OF THE INVENTION

It is an object of the invention to prevent unauthorized access to content disseminated by a content provider.

It is a further object of the invention to prevent a pirate from enabling a large number of persons to obtain unauthorized access to content from a content provider.

It is yet another object of the invention to provide a digital content protection architecture that may be used to provide conditional access to data, such as may be found in entertainment products and executables.

It is another object of the invention to provide high definition multimedia content on various media including, a DVD optical disc.

It is yet a further object of the invention to provide a protocol for packing content data into data packets for compression and transport.

To achieve the foregoing and other objects and in accordance with the purpose of the present invention as embodied and broadly described herein, the apparatus of the invention for secure distribution of content may comprise a source for accessing content data; a conditional access module for receiving the content data from the source and selectively processing the content data and selectively authorizing access to decoded processed content data; a receiver for receiving the processed content data from the conditional access module and decoding the processed content data into the decoded processed content data; and an output device for receiving the decoded processed content data from the receiver and outputting the decoded processed content data when authorized by the conditional access module.

Further, an apparatus according to the present invention for secure distribution of digital content may comprise a source for accessing content data, the source including a transport packet generation device for transforming the content data into content data packets; a conditional access module for receiving the content data packets from the source and selectively processing the content data packets; a receiver for receiving the processed content data packets from the conditional access module and decoding the processed content data packets; and an output device for outputting the decoded content data, wherein communications between the source, the receiver and the conditional access module utilize at least one packet data protocol.

Further, a method according to the present invention for preventing unauthorized access to content data in a system comprising a source, a conditional access module, a receiver and an output device, the method comprising: acquiring content data at the source; transporting the content data to the conditional access module; determining whether access to the content data is authorized; selectively processing the content data; transporting processed content data from the conditional access module to the receiver; decoding the processed content data; selectively providing the decoded processed content data to the output device; and outputting the decoded processed content data when authorized by the conditional access module.

Further, a method according to the present invention for preventing unauthorized access to digital content in a system comprising a source, a conditional access module, a receiver and an output device, the method comprising: acquiring content data at the source; transforming the content data into packet data; transporting the packet data from the source to the conditional access module; determining whether access to the packet data is authorized; selectively process the packet data; transporting the processed packet data to the receiver; decoding the processed packet data; and outputting the decoded content, wherein communications between the source, the receiver and the conditional access module utilize at least one packet data protocol.

In a further aspect of the invention, the conditional access module may further include a CAM fingerprint logic device for adding a CAM watermark to the content wherein the CAM watermark includes at least one of the following: a time of access of the content data, a serial number of the content data, a source identification value, a receiver identification value, and a conditional access module identification value.

In yet a further aspect of the invention, the output device may further include a display device and a watermark logic device, wherein the watermark logic device is operable to extract a watermark from the decoded processed content data; create an extracted watermark data packet from the watermark; output the extracted watermark data packet to the conditional access module; input an authorization from the conditional access module; and output an enable signal to the display device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which are incorporated in and form a part of the specification, illustrate an embodiment of the present invention and, together with the description, serves to explain the principles of the invention.

DETAILED DESCRIPTION OF THE INVENTION

Reference will now be made in detail to the presently preferred embodiments of the invention, examples of which are illustrated in the accompanying drawings.

Figure 1:
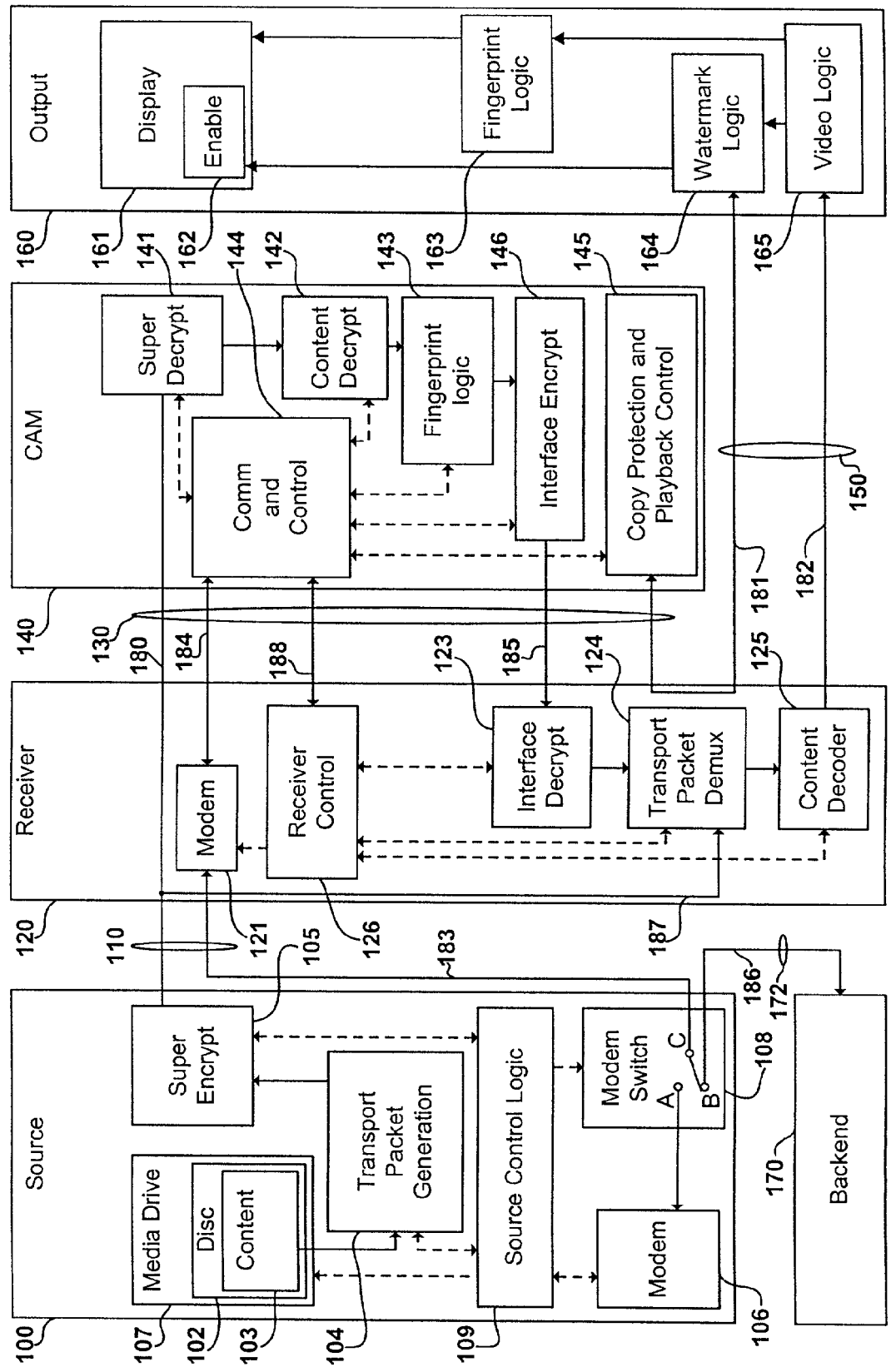
FIG. 1 is a block diagram of an embodiment of the present invention.

FIG. 1 is a simplified block diagram of an embodiment depicting an exemplary digital content distribution system according to the present invention. As shown in FIG. 1, a source 100 provides digital content to be displayed. This digital content may be derived from any number of potential signal sources including but not limited to an HD-DVD (High Definition Digital Versatile Disc), a terrestrial or satellite broadcast, a cable broadcast, a digital VCR, a computer, a set-top box, or the internet.

The source 100, acquires pre-authored content 103 from a content source, formats it and encrypts it so that it may be sent to a receiver 120 over an exposed interface 110.

Content 103 is typically authored movies and other multimedia data and applications and may be encrypted by any known encryption algorithm including but not limited to: TripleDES, DES, IDEA, or SKIPJACK. In the illustrated embodiment, the optical disc 102 comprises a DVD with a modified logical structure. One skilled in the art will appreciate that any type of media or disc capable of storing digital data may be used. The process of formatting and preparing content for recording on an optical disc 102 (also known as authoring) will be described below.

A media drive 107, is preferably a DVD disk drive capable of reading digital content 103 from the optical disc 102. This drive may include specialized hardware for reading any specially recorded optical disc 102. For standard optical discs, the structure of the media drive 107 is well known. The media drive 107 is controlled by a source control logic 109.

Figure 4:
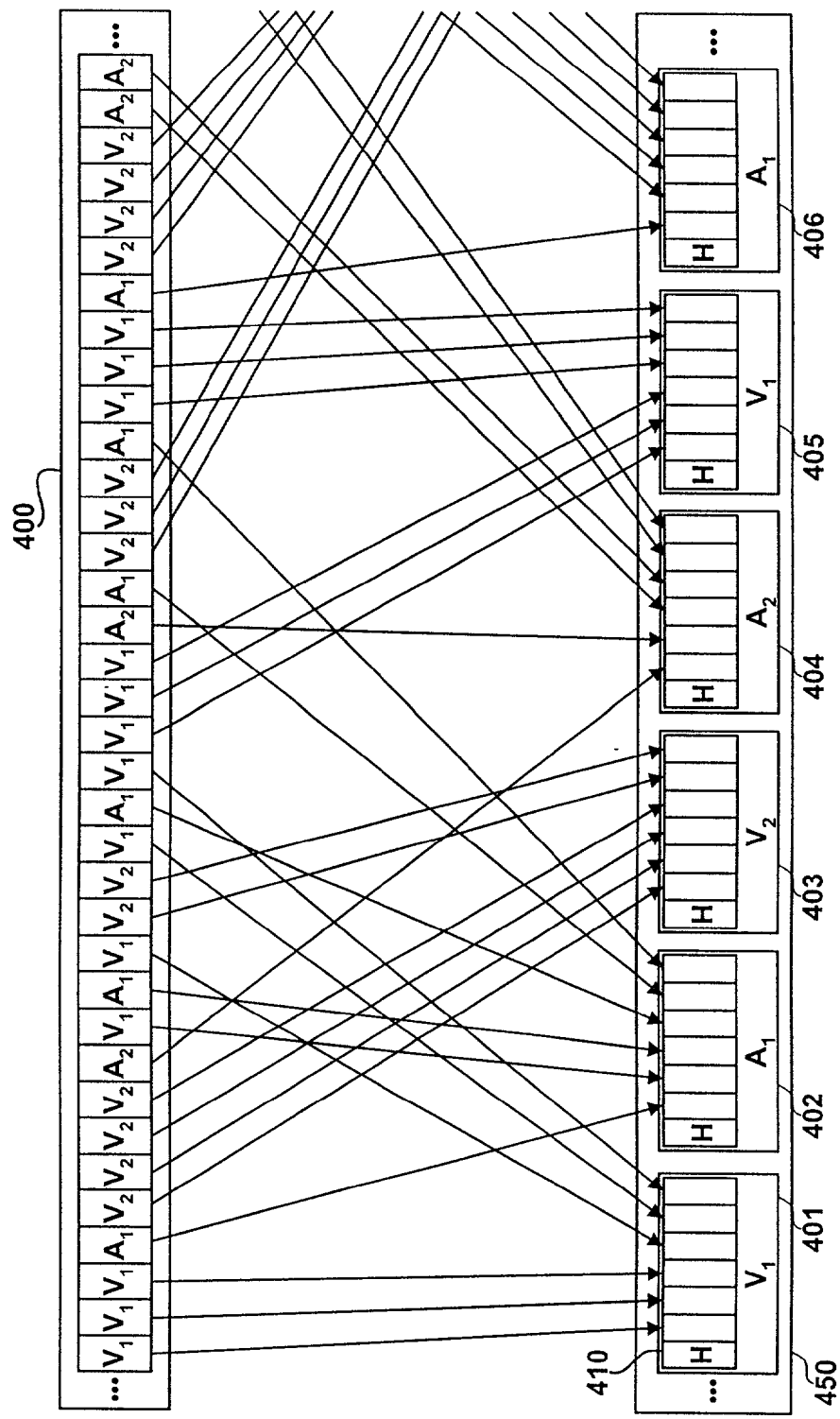
FIG. 4 is a diagram depicting an exemplary embodiment of the present invention wherein an ATSC transport packet stream is grouped and packed into DVD sectors.

The digital content 103 read from the optical disc is input to a transport packet generation device 104, where DVD sectors 450 are processed to reclaim modified Advanced Television Systems Committee ("ATSC") transport packets which are then inserted into the content data stream as transport packets. The transport packet generation device 104 may also insert commands for a receiver 120 and a conditional access module 140 ("CAM") into the content data stream. The transport packet generation device 104 is controlled by the source control logic 109. The digital content 103, in the form of DVD sectors 450 (FIG. 4) are processed sequentially. First, each DVD Sector Header 410 (FIG. 4) is analyzed to determine how to reconstruct the modified ATSC transport packets packed in sector 410 (FIG. 4). First, a determination is made as to the type of each packet by analyzing the packet type. Then using unique information in the header, ATSC packet header data is retrieved from the DVD sector. This retrieved packet header data is passed to the source control logic 109 which may include pointers which point to the beginning of frames, information that may be used to implement 'trick' modes, data that defines and assists in operating the source device, special device applications, special content applications, or the like.

Next, the individual ATSC transport packets are degrouped from the DVD sectors. A series of packing packets 401, 402, 403, 404, 405 and 406 (FIG. 4) for each type of packet is created. In the case of multiple packets of the same type, for example audio or video packets, a determination is made as to the size of the largest individual packet, and all of the packing packets for that type are then conformed to that size.

Each packet so formed is then retrieved from the transport packet generator 104. If a packet is fractional, it is saved for use when degrouping the next sector. In the illustrated embodiment, a 4-byte header is added back to the packet. It should be understood that the invention not so limited in terms of packet size. Then, consistent with the illustrated embodiment, the 4 bits of unique information from the original ATSC packet header are inserted into the reconstructed ATSC packet header. Next, the packet is overlaid onto the packing packet created for this particular type of packet. This ATSC transport packet (now a part of a content packet stream) is input to a super encrypt logic 105 as part of the content data stream.

The super encrypt logic 105 encrypts the digital content 103 using a secret (key) preferably known to the super encrypt logic 105 and a super decrypt logic 141 in the conditional access module 140. Thus, the content is protected as it travels across a first interface 110. The super encrypt logic 105 preferably stores multiple keys which allow the transmission of a super encrypted content data stream on a communication line 180 to multiple receivers 120 and their associated conditional access modules 140. The content may be encrypted by any encryption algorithm including but not limited to Triple DES, DES, IDEA, or SKIPJACK. It should be noted that it is possible to pass data through the super encrypt logic 105 without encrypting it. A decision as to whether to encrypt data may be provided by instructions, for example instructions contained within the digital content 103, or may be received from a backend 170. The super encrypt logic 105 is controlled by the source control logic 109.

A modem 106 is utilized to communicate to the conditional access module 140 through the receiver 120. The modem 106 is used to keep the source 100 informed regarding the state of the conditional access module 140 and may also be used to pass information between the source 100 and the rest of the system. The modem 106, which is preferably controlled by the source control logic 109, may alternatively be replaced by various communications devices well known in the art.

In the illustrated embodiment, a modem switch 108 switches a modem 121, located in the receiver 120 between ports A and B. Port A connects the modem 121 to the modem 106 located on the source 100. Port B connects the modem 121 to the backend 170. The backend 170 is typically located remotely from the source 100. Typically, connection via port B connects modem 121 to the backend 170 through a telecommunications network, (e.g. a telephone company modem, a direct modem to modem connection, or a connection through an Internet Service Provider ("ISP")). The source control logic 109 controls the position of modem switch 108. The default position of the modem switch 108 connects the modem 121 via port B to the backend 170 except when the source 100 requires access to the receiver 120, e.g. to communicate with the conditional access module 140. Other configurations of the switch may, for example, connect the modem 106 to the backend 170.

Operation of and communications with the source 100 is preferably controlled by the source control logic 109. The source control logic 109 receives data from the transport packet generation device 104 and pointers, which point to the beginning of frames for use in various operational modes.

The first interface 110 preferably contains communications lines between the source 100 and receiver 120. The primary communication line through the first interface 110 connects the super encrypt logic 105 to the super decrypt logic 141, (the latter preferably being provided on the conditional access module 140), passing via a second interface 130 to the receiver 120 and the conditional access module 140. The first communications line 180, which connects between the first and second interfaces, 110 and 130 respectively, may comprise an 8/VSB or 16/VSB interface. The communication line 180 transports the modified ATSC transport packets from the source 100 to the conditional access module 140. The 8NSB or 16/VSB interface may be replaced with a fast digital bi-directional interface capable of handling both video and commands. As an example, an IEEE 1394 interface could combine both the VSB and modem lines. A second communications line 183 connects the modem switch 108 to the modem 121.

Digital content 103 is arranged to fit into the bandwidth limitation of the modified transport packet stream. The illustrated embodiment, preferably maintains a 19.39 Mbps transport package throughput. Preferably, other content may be sent on the transport package stream by lowering the bandwidth available for the video and audio content, and using the extra bandwidth to transport other content, e.g. commands and sub pictures.

The receiver 120, sometimes referred to as a set top box, may receive content from any source 100.

The modem 121, located in the receiver 120, provides a communication link between the conditional access module 140 and depending upon the position of the modem switch 108, the source 100 or the backend 170. Data communicated over through modem 121 includes information relating to the state of the conditional access module 140, and feedback data to a communication and control logic 144 from the source control logic 109.

The backend 170 may, for example provide account and system management. Uploaded information may include any or all of the following: content key information used to enable content decryption, super encryption/decryption key information used to enable the super encryption functionality, interface encryption/decryption key information used to enable the interface protection functionality, play window data for specific digital content or title tables. The title tables may include data such as watermark identification, conditional access keys for a content decrypt logic 142, and play authorization data. This communication link may also be used to download play journals, system statistics, data, etc.

An interface decryption logic 123, decrypts the data stream returned from the conditional access module 140 to the receiver 120 for further processing by a transport packet demultiplexer logic 124 and a content decoder 125 before being sent to a monitor 160. The interface decryption logic 123 uses a shared secret between itself an interface encryption logic 146 to perform decryption. The decryption algorithm used corresponds to the encryption algorithm used in the interface encryption logic 146. This shared secret may be generated by any known technique or may be generated by a technique disclosed in copending and commonly assigned application Ser. No. 09/252,013.

A receiver control logic 126 controls the operation of the receiver 120, including the modem 121, the interface decrypt logic 123, the transport packet demultiplexer 124 and the content decoder 125. The receiver control logic 123 communicates with the conditional access module 120 through the second interface 130 and to the source 100 via the first interface 110.

The transport packet demultiplexer logic 124 converts the transport packet data stream into elementary data packets which for example includes video, audio, and control data. Video and audio elementary data packets are forwarded to the content decoder 125. The rest of the packets (such as control packets) are forwarded to the receiver control logic 123.

The content decoder 125 decodes the digital content, now formatted in a digital content data stream (such as MPEG), into a form that may be utilized by an output device 160 to present the content to a viewer. In this embodiment, the content is preferably converted into an analog signal by known techniques. As should be recognized by those skilled in the art, different monitors may require different signal forms. For example, a digital signal may be provided for an LCD or plasma display, whereas an analog signal might be more efficient for a conventional CRT. The content decoder 125 may dynamically handle different types of coded content, e.g. MPEG and AC-3.

The second interface 130 provides a signal path between the conditional access module 140 and the receiver 120. The signals that cross this interface preferably include super encrypted digital content between the super encryption logic 105 and the super decryption logic 141, command, control, and authorization data between the modem 121 and a communication and control logic 144, interface encrypted digital content between interface encryption logic 146 and an interface decryption logic 122 and authorization data between a copy protection and playback control logic 145 and a watermark logic 164 in the output device 160.

The conditional access module 140 may be a renewable device, having logic to analyze the system and the content 103 in order to determine whether the content 103 may be displayed. By renewable, we mean that the conditional access module may be updated by either replacing the device and/or secrets used by the conditional access module and preferably reestablish pairing relationships between the conditional access module and the other devices in the system. The conditional access module 140 may also contain logic to prevent the content 103 from being displayed, logic to log system operations, etc. The conditional access module 140 may include the communications and control logic 144, the super decryption logic 141, content decryption logic 142, fingerprint logic 143, the interface encryption logic 146, and the copy protection and playback control logic 145. Each of these elements will be discussed below.

The super decryption logic 141 uses a shared secret between itself and the super encryption logic 105 to decrypt the super encrypted transport packets encrypted by the super encryption logic 105. The content decryption logic 142 uses a secret key provided by the backend 170 to decrypt the content 103, which was encrypted at the time it was authored utilizing the corresponding secret key. The interface encryption logic 146 uses a shared secret between itself and the interface decryption logic 122 to encrypt the transport packets for transport over the second interface 130 to the interface decryption logic 122. The purpose of this re-encryption is to protect the transport packets as they travel over the second interface 130 where the packets may be exposed to third parties. The encryption algorithm used may be any known encryption algorithm such as DES, Triple DES, or an algorithm disclosed in copending and commonly assigned application Ser. No. 09/252,013.

The fingerprint logic 143 adds watermarks to the output signal of the interface encryption logic 146. The watermark is embedded into the digital content and provides tracing information about a particular use, or an instance of the content being placed into a multimedia signal. Preferably the fingerprint information is hard to detect, hard to remove, and resistant to collusion. Some exemplary identifying information about the play session includes, but is not limited to, time of access, serial number of the content being viewed, source 100 identification data, receiver 120 identification data, conditional access module 140 identification data, and output device 160 identification data. The fingerprint logic 143 preferably uses known techniques to embed the watermark into the content 103.

The protection and playback control logic 145 compares the watermark data detected from the content display stream by a watermark logic 164 for the output device 160 with data which indicates what the appropriate watermark should be for the digital content 103 currently being played. The protection and playback control logic 145 sends a message back to the watermark logic 164 as to whether to disable a display 161 in the output device 160, hence providing a mechanism to prevent unauthorized viewing of the content 103. The message must have enough information for the watermark logic 164 to verify the message. The message may be verified using any verification function; for example a hash function utilizing a shared secret between the protection and playback control logic 145 and the watermark Logic 164, as described in copending, commonly assigned application Ser. No. 09/252,013, or a digital signature.

The blocks in the conditional access module 140 are preferably controlled by the communications and control logic 144. The communications and control logic 144 also handles communication between the conditional access module 140 and the source 100, including communications regarding the status of the conditional access module 140 sent back to the source 100, and user interactions and control of system functions. The communications and control logic 144 also handles communications between the conditional access module 140 and the backend 170, including updating title tables, updating keys, updating watermark identification, and downloading transaction and system data.

A third Interface 150 transports video data, audio data, and authorization data from the receiver 120 to the output device 160. The authorization data is preferably transported between the copy protection and playback control logic 145 typically in the conditional access module 140, and the watermark logic 164 in the output device 160. This link facilitates an important copy protection mechanism utilized in this system architecture. Validation data is transported back and forth over this link whereby a decision may be made by the watermark logic 164 as to whether to allow the content 103 to be displayed on the display 161.

The output device 160 receives a display stream from the receiver 120, retrieves watermark data from the display stream and, in conjunction with the copy protection and playback control logic 145, decides whether the content may be displayed. If the decision is affirmative, then the content 103 is enabled for the display 161. This process may be performed regularly throughout the viewing of the content 103. The output device 160 typically includes the display 161, a display enable 162, the fingerprint logic 163, the watermark logic 164, and a video logic 165.

The display 161 may be any video display device (e.g., a CRT, a plasma display device, a projection display device, or an LCD display device). The display enable logic 162 inputs a signal from the watermark logic 164 and enables or disables the output of the display 161 appropriately. Fingerprint logic 163 embeds identifying information into the display signal similar to the fingerprint Logic 143. It may be advantageous to add other identifying information related to the output device 160 in addition to the information described in the description of the fingerprint logic 143. The watermark logic 164 removes watermarks that were embedded in the content 103. Each time it identifies new watermark data, this information is relayed to the copy protection and playback control logic 145 for analysis. Feedback is then returned from the copy protection and playback control 145 about the validity of the content stream for presentation on the display 161. A signal is then sent to the display enable logic 162 to disable or enable the display 161. If no changes occur in the watermark data for more than a defined period of time, the watermark logic 164 may ask for fresh authentication. The watermark logic 164 is preferably paired with the copy protection and playback control logic 145 and verifies the authorized message from the copy protection and playback control 145.

The video logic 165 receives the display stream over a communications line 182 from the content decoder 125 and passes a copy of the display content stream to the watermark logic 164, and the fingerprint logic 163. The video logic 165 converts the decoded content data into a content signal that may be used by the display 161.

The backend 170 for the system is usually located remotely from the rest of the system. It preferably includes physical data processing equipment, communications links, and software systems. The backend 170 provides functions that include, but are not limited to, account management, content access, encryption/decryption pairing assistance, and uploading to the system, title keys, watermarks, and data required for content access. Data required for content access preferably include recalled content, prices, release dates, promotions, and downloads from the system such as content access journals and system journals.

As used herein, the term "data stream" refers to a continuous or semi-continuous flow of data that is moving through the system. It is convenient to label these streams to assist in understanding the flow of data through the system. Although data may travel through the system, it is the collection of data that comprises the data stream and not the hardware per se. Typically, there are several data streams in the system. They preferably include a super-encrypted content data stream (which may be found on the communications line 180), a watermark authorization stream (which may be found on the communications line 181), a content display stream (which may be found on the communications line 182), a receiver back channel data stream (which may be found on the communications line 183), a conditional access module back channel data stream (which may be found on the communications line 184), an interface stream (which may be found on the communications line 185), a backend data stream (which may be found on the communications line 186), unencrypted content stream (which may be found on the communications line 187), and a receiver/CAM control stream (which may be found on the communications line 188).

The super encrypted content data stream which contains super encrypted content data is transported over communications line 180 to the receiver 120 and the conditional access module 140 from the super encrypt logic 105 on the source 100. This data stream does not always have to be super encrypted. The super encrypt logic 105 may be enabled or disabled by the source control logic 109. When the super encrypt logic 105 is disabled, the data stream from transport packet generation logic 104 will preferably pass through super encrypt logic 105 without any modification.

An authorization data stream is transported over communications line 181 which connects the watermark logic 164 in the output device 160 and the copy protection and playback control logic 145 in the conditional access module 140 over the second interface 130 and the third interface 150. Information relating to authorizing the display of content 103 on the output device 160 is communicated in this data stream.

The communications line 182 transports the content display stream from the content decoder logic 125 on the receiver 120 to the video logic 165 on the output device 160 over the third interface 150. This data stream carries the decoded content for display on the output device 160.

Two of the data streams comprise a back channel for this system, a receiver back channel data stream is (which may be found on the communications line 183) and a CAM back channel data stream (which may be found on the communications line 184). The communications line 183 transports the receiver back channel data stream from the modem 121 on the receiver 120 to the modem switch 108 on the source 100 over the first interface 110. The communications line 184 carrying the CAM Back channel data stream connects the communications and control logic 144 on the conditional access module 140 to the modem 121 on the receiver 120 over the second interface 130. These data streams provides a channel for the conditional access module 140 and the receiver 120 to communicate their state and other information to the source 100 and the backend 170.

The interface data stream (which may be found on communications line 185) carries a freshly encrypted version of the content after the conditional access module has otherwise processed it from the interface encrypt logic 146 on the conditional access module 140 to the interface decrypt logic 123 on the receiver 120 over the third interface 130. This fresh encryption of the content protects the content while being transported over the second interface 130 where it could be compromised.

The communications line 186 transports a backend data stream between the backend 170 and the system through the modem switch 108 on the source 100 over the fourth interface 172.

All data that comes from the source 100 does not need to be encrypted. The unencrypted content stream (which may be found on communications line 187) provides a shortcut for the digital content stream to proceed directly to the transport packet demultiplexer 124. In the cases where the content is not encrypted and no protection is needed for the digital content 103, the pathway through the conditional access module may be bypassed. The transport packet demultiplexer logic 124 may easily determine if the unencrypted content stream (which may be found on communications line 187) is in fact unencrypted. If the content data stream (which may be found on communications line 187) is unencrypted, then the transport packet demultiplexer logic 124 will process data from this stream rather than the data coming from the interface decrypt logic 123.

The receiver/CAM control stream (which may be found on communications line 188) provides a communications channel for the conditional access module 140 to communicate with the receiver 120. Information that two subsystems might share could include status data, synchronization data, and control data.

Figure 2:
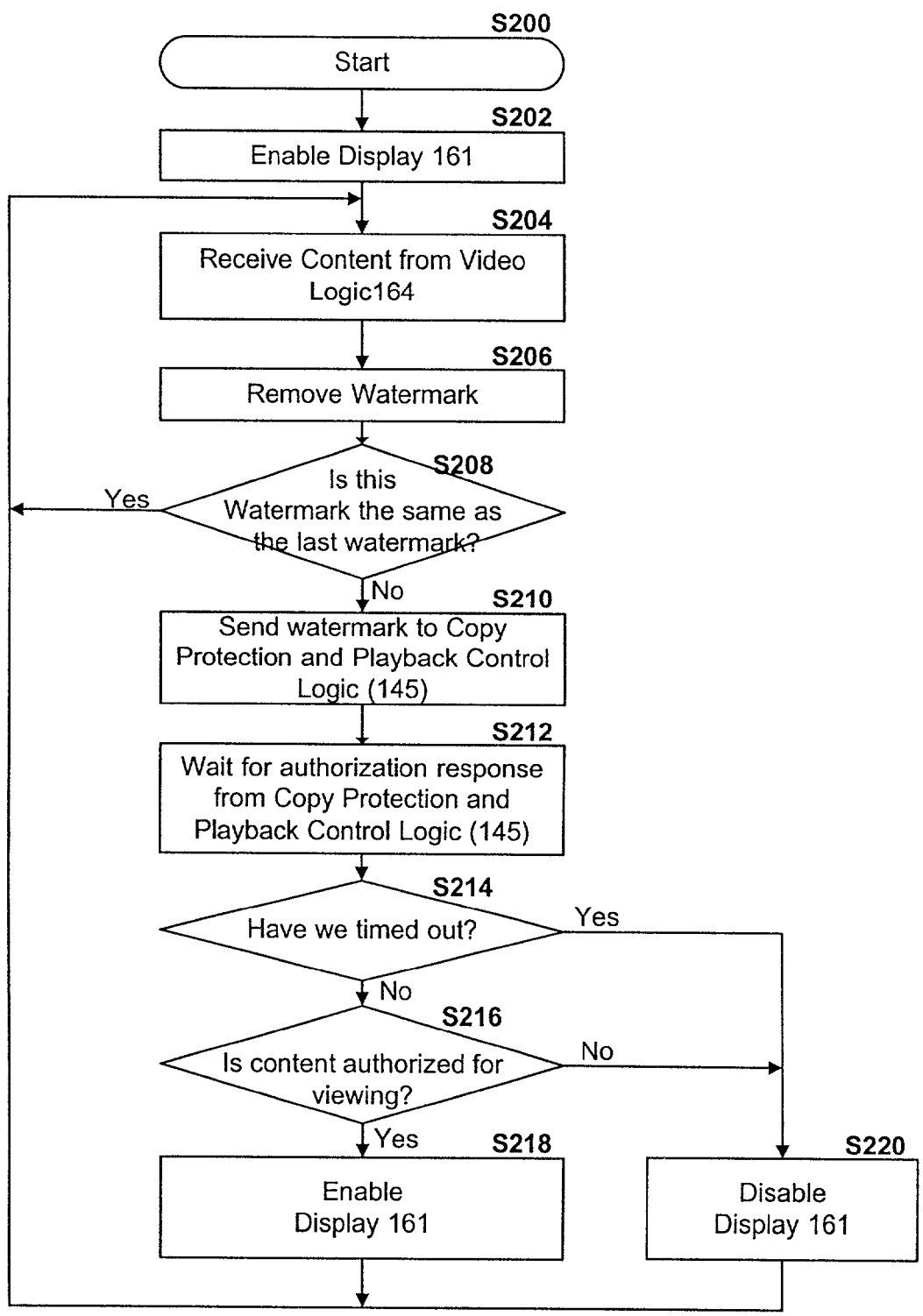
FIG. 2 is a flow diagram depicting an embodiment of the Watermark Logic (164) of FIG. 1.

Referring now to FIG. 2, which is a flow diagram of the watermark logic 164 shown on FIG. 1, there is depicted an exemplary logic (which includes analysis of the watermark contained in the content) used to determine if the output device 160 should or should not be enabled.

At step S202 the watermark logic 164 initializes the monitor 161 to an enabled state by sending an enable signal to the monitor enable logic 162. Content 103 is received from the video logic 164 at step S204. The watermark is removed from the video content at step S206. Next, the watermark that was just removed from the video content is compared to a predetermined watermark which, may be a previous watermark, at step S208. If the watermarks are the same, the content is authorized for viewing and the display 161 is enabled at step S218. In essence, this step is detecting a change in the watermark. If the watermark has changed, then a copy of it is sent to the protection and playback control logic 145 in the conditional access module 140 for authorization at step S210. At step S212, the watermark logic 164 waits for a response from the copy protection and playback control logic 145. If the response has timed out (step S214), then the display is disabled at S220. Otherwise control passes to step S216 where the response is analyzed to see if the content is authorized for viewing. If the content is authorized for viewing, then the display 161 is enabled at step S218. If the content is not authorized for viewing, then the display 161 is disabled at step S220. Control then returns to step S204 where the process starts again.

Figure 3:
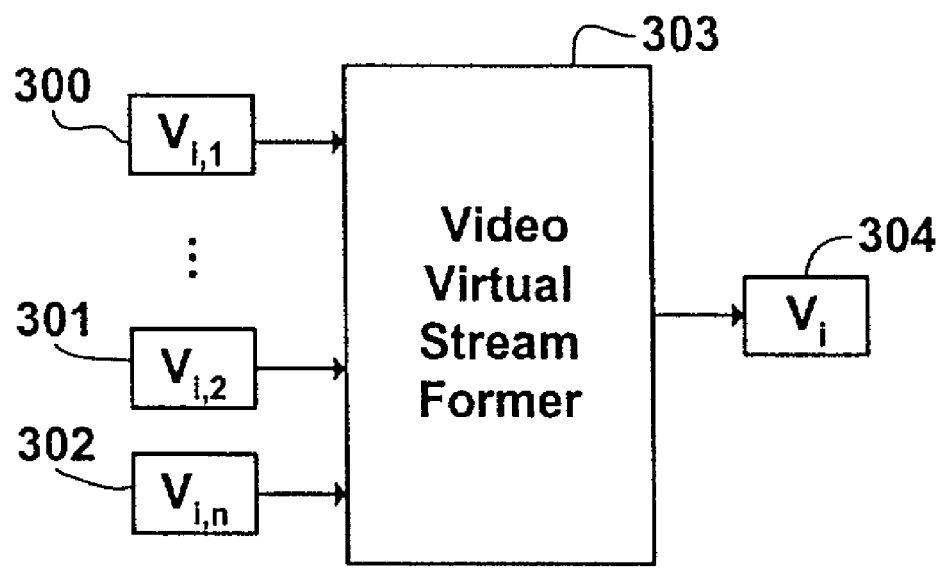
FIG. 3 is a block diagram of an embodiment of an aspect of the present invention wherein a single ATSC transport packet stream may be created which combines several different display streams.
Figure 3:
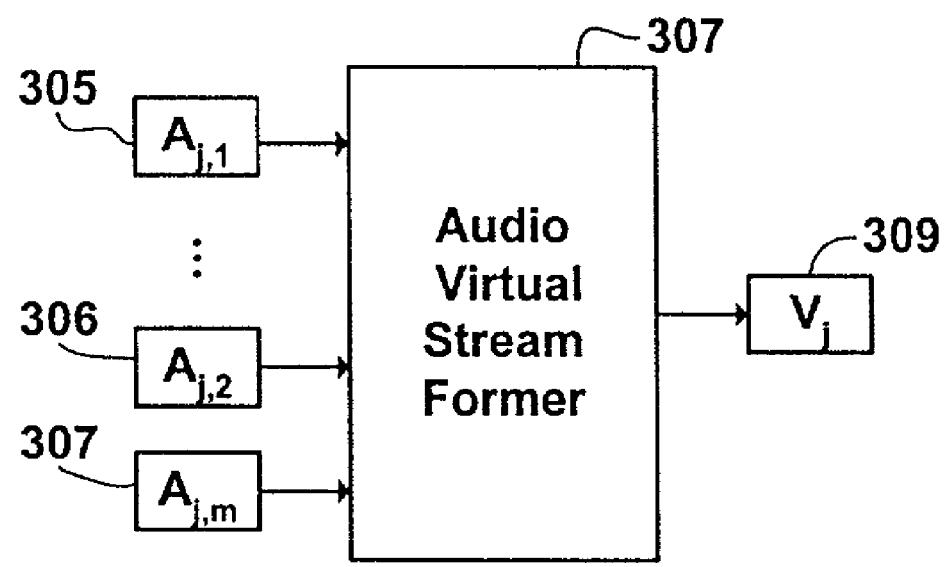

FIG. 3 depicts the creation of a single exemplary ATSC transport packet stream which combines several different display streams, in essence creating virtual streams. This process takes place as part of the disc authoring process. Authored content 103 may have multiple streams. There may be several types of streams including but not limited to audio and video. Each stream type may have multiple streams. Examples include multiple video angles, multiple languages, and different rating cuts.

Blocks 300, 301 and 302 represent n virtual video streams for a channel i. The display stream for virtual video channel 1, option 1 is $V_{i,1}$ 300. The display stream for virtual video channel 1, option 2 is $V_{i,2}$ 301. The display stream for virtual video channel 1, option n is $V_{i,n}$ 302, where n may be any value between 1 and the maximum number of choices available for this virtual video stream.

The video virtual stream former 303 accepts as input all of the possible video display streams that need to be recorded on content 103. The video virtual stream former 303 combines these streams into one continuous ATSC stream. Information identifying which stream each packet originated from is stored in packet headers. The resultant stream is $V_i$ 304. The Blocks 305, 306 and 307 represent n virtual audio streams for a channel j. The display stream for virtual audio channel 1, option 1 is $V_{j,1}$ 305. The display stream for virtual audio channel 1, option 2 is $V_{j,2}$ 306. The display stream for virtual audio channel 1, option n is $V_{j,m}$ 302, where m may be any value between 1 and the maximum number of choices available for this virtual audio stream.

The audio virtual stream former 307 accepts as input all of the possible audio streams that need to be recorded on content 103. The audio virtual stream former 307 combines these streams into one continuous ATSC stream. Information Identifying which stream each packet originated from is stored in packet headers. The resultant stream is shown as $V_j$ 309.

FIG. 4 depicts an example of an ATSC transport packet stream, grouped and packed into DVD sectors. In this example the ATSC transport packet stream consists of packets for two video streams and two audio streams. In the preferred embodiment, each DVD sector will only contain ATSC packets of a particular display stream. There may be several display streams for each type of packet.

Each packet in the ATSC transport packet stream 400 is preferably processed sequentially, as follows. The packet header is analyzed to determine which stream the corresponding packets come from. The packet is then packed into a DVD sector reserved for only packets of the type matching this packet. For example, six $V_1$ packets in ATSC transport packet stream 400 may fit in and are packed into DVD sector 401. After ATSC transport packet stream 400 is filled, the next $V_1$ packet will be packed into DVD sector 405, and so on. In this example the same process takes place for the $A_1$, $A_2$, and $V_2$ packets. Provisions may be made for packing packets across sector boundaries, by storing enough information in the sector headers to restore the packets. Such information may only need to be a flag to indicate that the first packet of data in a sector is fractional. The system may then concatenate this packet to the last packet of this type received when reconstructing the stream later.

Figure 5:
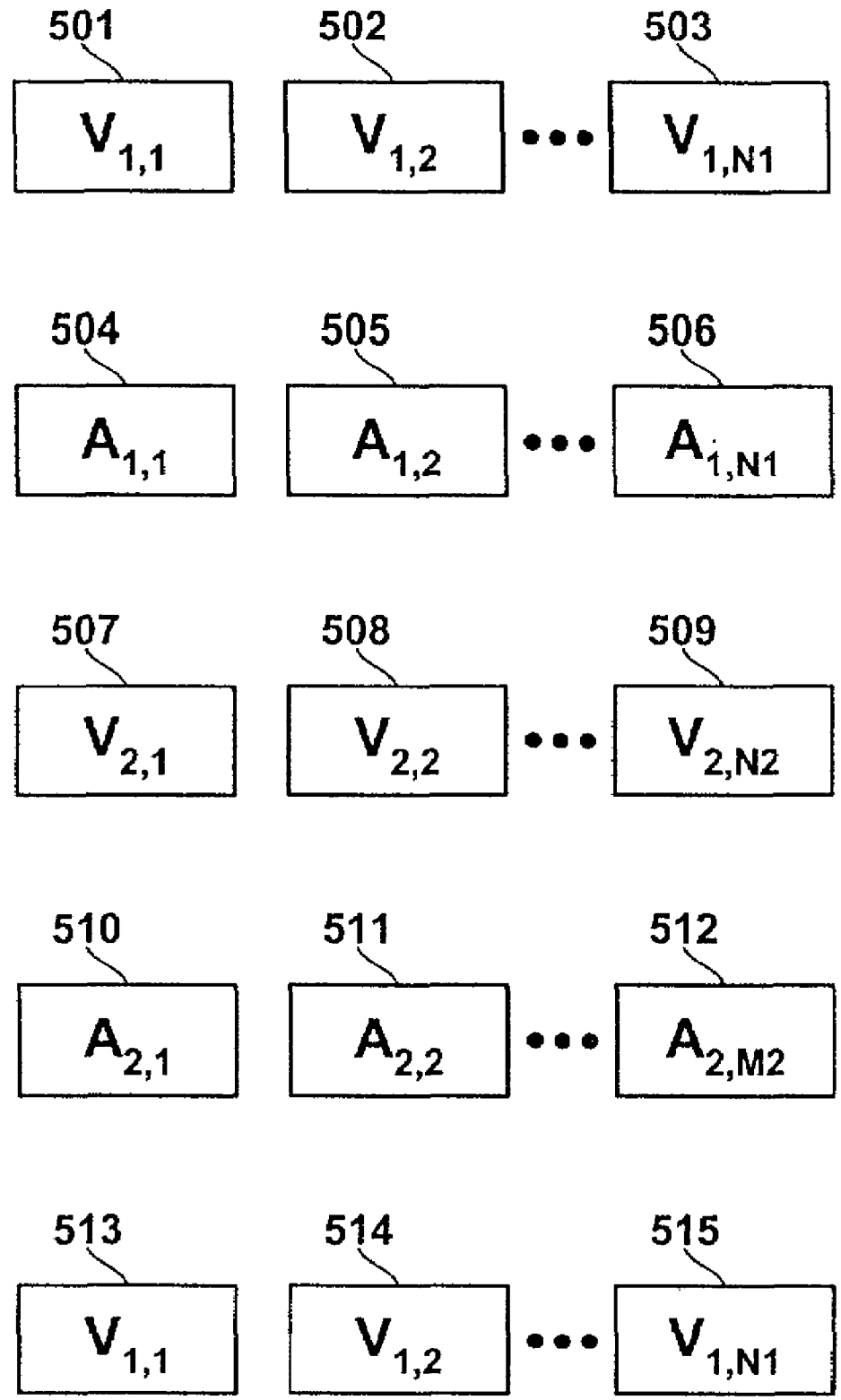
FIG. 5 is a block diagram of an exemplary aspect of the present invention depicting exemplary audio and video streams laid out on an optical disc.

FIG. 5 depicts exemplary audio and video streams laid out on a DVD disc. In this example, the DVD sectors 450 contain packets of only one stream each. Sectors 501, 502, 503, 513, 514, and 515 contain packets for a first video stream. Sectors 507, 508, and 509 contain packets for a second video stream. Sectors 504, 505 and 506 contain packets for a first audio stream. Sectors 510, 511 and 512 contain packets for a second audio stream. The packets may be laid on the disc in any order, but for efficiency's sake, they are usually laid out in as close an order to their likely access as possible.

The optical disc may be authoring as follows. The disc may contain several elementary streams that may include but are not limited to elementary audio and elementary video streams. Multiple streams may exist for each of the elementary stream types. The content from these elementary streams is converted to standard ATSC transport packet streams. A virtual stream is created as shown in FIG. 3 for each stream type which combines all of the multiple streams of that type. The virtual streams are then multiplexed together into one ATSC transport packet stream 400. The ATSC transport packet stream 400 is grouped into DVD sectors 450 as shown in FIG. 4, including the case of padding packets. The ATSC transport packets may be modified utilizing common well-known compression algorithms to reduce their size.

A sector header is created. Four bits of unique information from the ATSC packet header are saved for insertion into the DVD-sector header for use during reconstruction. These four bits include 2 transport_scrambling_control bits and two adaption_field_control bits. The four-byte header from the ATSC transport packet may now be discarded as well as padding packets. Information required to restore the ATSC packet stream, including padding packets, is saved for insertion into the DVD sector headers.

Next, the modified ATSC transport packets are packed into the DVD sectors, utilizing an ATSC to DVD grouping algorithms. FIG. 4 shows an example of ATSC transport packets being grouped into DVD Sectors. In our preferred embodiment, each sector may only carry one type of data corresponding to the ATSC transport packet types. Sector packet types may include but are not limited to video or audio packets.

The sector header will carry information to assist the reconstruction of the original ATSC transport packets. This information may include but is not limited to pointers to packets which contains the beginning of a frame, pointers to the beginning of a fractional packet, location data for audio and video packets, the number of packets packed into this frame, the sector type identifier, and unique ATSC packet header data.

The DVD data sectors then are laid out for recording on the media. The layout process should optimize the sectors to produce efficient access of the content.

The present invention provides a series of security features to adequately protect the transmission of content data from a source device to a display device. The security features include pairing, super-encryption and re-encryption, interface protection, pirate card rejection, watermark detection and authorization request by the monitor, key management and registration, disc/title integrity data, and utilization of a new HD-DVD disc structure.

A device A is paired to a device B if device B is authorized to effectively communicate with device A. Possible pairs utilized in this system include conditional access module 140 to source 100, receiver 120 to conditional access module 140, and conditional access module 140 to monitor 160. Pairing is extensively utilized in this architecture to ensure that a predetermined flow of data and authorization is maintained, and that all of the hardware elements are in fact the intended hardware elements to be in this system.

Interface protection techniques are used to protect content while traveling across the first interface 110, the second interface 130, or the third interface 150. Super-encryption and re-encryption are utilized as a technique to protect the encrypted content as it is transported from the source 100, across the first interface 110 and the second interface 130, to the conditional access module 140. The encrypted content is encrypted again using a secret known only to the super encrypt logic 105 and super decrypt logic 141, in the case that the conditional access key used to encrypt the digital content 103 has been compromised. Again, the encryption may be any type of encryption including DES and triple DES.

Pirate Card Rejection techniques are also used, wherein several factors may cause the system to reject the conditional access module 140 as an authorization device. An example includes title based rejections where the conditional access module 140 must prove its identity to the system based on a title by title basis. Another example includes rejection because the conditional access module was not authorized to communicate in the system.

Watermark detection and authorization request by the output device 160 is another protection mechanism utilized in this system. A content data stream 182 is generated by a content decoder 125. This content decoder may be an MPEG decoder or some variant. Data is transported to the watermark logic 164 through the video logic 165. The watermark logic pulls out the watermark data from the data content stream and compares the watermark data to see if watermark data has changed from the last authorized watermark or if a timeout period has occurred. If either case has happened, then the watermark logic 164 requests a new authorization from the copy protection and playback control logic 145 to enable the display 161.

The following is a discussion of Conditional Access and Interface Protection utilized in this architecture. The security architecture utilizes a bi-directional communications path between the source 100 and the receiver 120. In particular, use is made of the path from the conditional access module 140 to the source 100 in order to strengthen the pirate-card-rejection verifier functionality. The conditional access module 140 is accessed while present in a card-slot of the receiver 120 during communications between the source 100 and conditional access module 140, communications between the conditional access module 140 and receiver 120, and communications between the conditional access module 140 and the backend 170. It is the responsibility of the backend 170 to reconcile charges. In particular, conditional access modules 140 associated with different receiver devices 120 do not directly communicate.

A conditional access module 140 to source 100 pairing provides for a means of distributing a long-term shared secret value secret to the source 100 and conditional access module 140. The one-way pairing authenticates the conditional access module 140 to the source 100. The conditional access module 140 will accept content regardless of origin. The conditional access module 140 to source 100 pairing provides for pirate card rejection in that a compliant source 100 will not effectively communicate with a conditional access module 140 which is not in possession of the long-term shared secret value. This is accomplished through implicit authentication since only the designated conditional access module 140 has the capability of deriving the session key from the long-term shared secret value, where the session key is used to super-encrypt the digital content 103. More specifically, a key may be used to encrypt the encrypted digital content 103 that results from processing the plaintext content data under the conditional access (CA) key. The session keys may derive freshness from counter values provided to the conditional access module 140 in the clear by the source 100. There is no need for the conditional access module 140 to provide freshness to the source 100, since replay of the super-encrypted content 103 to the conditional access module 140 would result in additional logging.

The super-encryption mechanism employed by the source 100 also is provides for interface protection of the encrypted digital content 103, which could otherwise be decrypted using a pirate apparatus which makes use of the universal key present in all legitimate conditional access modules 140.

As a further layer of protection, to ensure that the use of digital content 103 is logged by the conditional access module 140 at least once as a condition of playback, the Title ID information may be transmitted (assuming that it is otherwise permitted) by the source 100, where the source 100 may require an authenticated receipt of the Title ID information from the conditional access module 140 prior to transmission of the (super-encrypted) digital content 103. The receipt may be freshly authenticated by the conditional access module 140, for subsequent verification by the source 100, using a most recent counter value provided by the source 100. Although the authentication mechanism and the session keys may both based on the long-term shared secret value, the authentication may be cryptographically stronger because it ultimately uses a significantly longer key.

The receiver 120 may supply freshness to the conditional access module 140 in order to prevent effective replay of the content data 103 from the conditional access module 140 to the receiver 120. The conditional access module 140 encrypts the plaintext content 103 read from the optical disc using a session key negotiated between the conditional access module 140 and receiver 120. The session key computation may derive freshness from a counter value provided by the receiver 120. A receiver 120 to conditional access module 140 pairing provides for a means of distributing a long-term shared secret value to the conditional access module 140 and receiver 120. The receiver 120 to conditional access module 140 pairing provides for implicit authentication by ensuring that only the designated receiver 120 will be able to derive the session key by means of possession of the long-term secret. This one-way pairing authenticates the receiver 120 to the conditional access module 140. The receiver 120 may accept content for decryption regardless of origin.

Session keys may be derived through any number of techniques known to those in the art. For example, a single-DES session keys could be derived by computing $Hash_{56}$(counter || shared secret value || counter); and (in the case of communications between the source 100 and the conditional access module 140) authenticated receipts may be formed by $Hash_{96}$(message || $Hash_{64}$(counter shared secret value || counter)) $Hash_{96}$(counter || shared secret value || counter), where the counter value is incremented by one between the computation of authenticated receipts and session keys. $Hash_{56}()$ may be derived by extracting the 56 least significant bits of a 160-bit hash word, $Hash_{64}()$ may be derived by extracting the 64 least significant bits of the hash word, and $Hash_{96}()$ may be derived by extracting the 96 most significant bits of the hash word. || denotes concatenation of bit-streams, and $\oplus$ denotes the bit-wise exclusive-or operation.

The conditional access module 140 to source 100 pairing may be achieved as follows. In order to effect the pairing between the conditional access module 140 and the source 100, the backend 170 could issue a certificate binding the source ID to the Diffie-Hellman public key of the conditional access module 140, $g^{Xcam}$. The Diffie-Heliman public key of the source 100, $g^{Xplayer}$, need not be authenticated. If the certificate verifies correctly, and the player ID within the certificate matches the ID of the source, the player sets the long-term shared secret value to the 256 least significant bits of the Diffie-Hellman value computed using $g^{Xcam}$ and $X_{player}$, namely $(g^{Xcam})^{Xplayer} = g^{Xcam*Xplayer}$. The session keys may be computed based on the long-term shared secret value. The player's Diffie-Hellman key pair and source ID may be established during the manufacturing process or may be generated in the source 100 using suitable randomness. A source ID may be used by the source 100 to determine whether it is authorized to communicate with the conditional access module 140, and thus could be chosen so as to be very unlikely to coincide with the IDs of other sources.

The receiver 120 to conditional access module 140 pairing may be achieved as follows. In order to effect the pairing between the conditional access module 140 and the receiver 120, the receiver 120 may transmit to the conditional access module 140 the certified Diffie-Hellman public key, $g^{Xfinal}$ of the receiver devices 120, and the conditional access module 140 may transmit to the receiver 120 the unauthenticated Diffie-Hellman public key, $g^{Xcam}$ of the conditional access module 140. The certificate may be verified by the conditional access module 140 using the appropriate chain of certified keys. If this certificate verifies correctly, the conditional access module 140 may use its private Diffie-Hellman key $X_{cam}$ in conjunction with $g^{Xfinal}$ in order to compute the Diffie-Hellman value $(g^{Xfinal})^{Xcam}=g^{Xfinal*Xcam}$. As the credential confirmation step, the most significant 256 bits of this value may be checked for a match against the 256 bits transmitted to the conditional access module 140 by the receiver 120 (after the conditional access module 140 transmits $g^{Xcam}$ to the receiver 120. If the two 256-bit blocks match, the conditional access module 140 may set the long-term shared secret value held by it with the receiver 120 to the 256 least significant bits of the Diffie-Hellman value $g^{Xfinal*Xcam}$. The certificate and evidence-of-compliance block of the receiver device's 120 $g^{Xfinal}$ may be sent (authenticated by the conditional access module 140 to the backend 170. The session keys and authenticated receipts may be computed based on the long-term shared secret value with the receiver 120. The next section explains, in particular, the generation procedure for $X_{final}$.

One skilled in the art will appreciate that registration and certification techniques may also be used in this system to enable the authentication of an individual receiver 120 and to enable clone detection. This will enable confirmation that each receiver 120 was built with the consent of the licenser, without unnecessarily exposing secrets held by the receiver 120. Therefore, we have the following four goals: clone detection, unit-by-unit licensing, manufacturer accountability over licensed units, and limited manufacturer and licenser responsibility for receiver 120 secrets.

We also do not assume that the receiver 120 has a good random number generator, in that we make productive use of such randomness but ensure that an acceptable level of security is preserved even if such randomness may not be relied upon for strength.

Although there may be a single licensing authority, there may be many licensed competing receiver 120 manufacturers, and customers may have access to many service providers, all of who may have no reason to trust one another. For example, a receiver 120 should be able to move between service providers without introducing trust dependencies between those providers.

A clone device may be defined as either an exact copy of a manufactured receiver 120 or built from the keying material the licenser gave the manufacturer for that device. Unit-by-unit licensing requires that the licensers produce and distribute the secrets to be held by the receiver 120. Limited manufacturer and licenser responsibility for these secrets requires that the secrets be placed in the receiver 120 not be valid forever in the sense that knowledge of these secrets is not sufficient to compromise compliant receivers 120. Eliminating trust dependencies between service providers requires that service providers not know receiver 120 keys, and therefore that public-key cryptography is used.

Although the present invention has been fully described by way of examples with reference to the accompanying drawings, it is to be noted that various changes and modifications will be apparent to those skilled in the art. For example, it will be apparent to those of skill in the art that the content may be provided from any type of source device which may produce content which may be encrypted according to principles of the present invention. Therefore, unless such changes and modifications depart from the scope of the present invention, they should be construed as being included therein.

We claim:
1. An apparatus for secure distribution of content comprising:
 (a) a source for accessing content data;
 (b) a conditional access module for receiving the content data from said source and selectively processing the content data and selectively authorizing access to decoded processed content data;
 (c) a receiver for receiving the processed content data from said conditional access module and decoding the processed content data into said decoded processed content data; and
 (d) an output device for receiving the decoded processed content data from said receiver and outputting the decoded processed content data when authorized by said conditional access module.

2. The apparatus according to claim 1 wherein said source comprises an optical disc reader.

3. The apparatus according to claim 2 wherein said optical disc reader is a DVD optical disc reader.

4. The apparatus according to claim 1, wherein the apparatus is used with a backend system and wherein said source further comprises:
 (a) a source modem for communicating with said receiver and said backend; and
 (b) a modem switch for switching between any two devices within the group consisting of said receiver, said source modem, and said backend.

5. The apparatus according to claim 1, wherein the apparatus is used with a backend system and wherein said receiver further comprises a receiver modem for communicating with said conditional access module, said source, and said backend.

6. The apparatus according to claim 1, wherein said content data is encrypted and said conditional access module further comprises a content decrypter to decrypt said encrypted content data into the processed content.

7. The apparatus according to claim 6, wherein said source further comprises a super encryption device for super encrypting the encrypted content data and wherein said conditional access module further comprises a super decryption device for super decrypting the super encrypted content data.

8. The apparatus according to claim 1, wherein said conditional access module further comprises an interface encryption device for encrypting the processed content data and wherein said receiver further comprises an interface decryption device for decrypting the interface encrypted processed content data.

9. The apparatus according to claim 1, wherein said conditional access module is renewable.

10. The apparatus according to claim 1, wherein said conditional access module further includes a CAM fingerprint logic device for adding a CAM watermark to said content data.

11. The apparatus according to claim 10, wherein said CAM watermark includes at least one of the following:
 (a) a time of access of said content data;
 (b) a serial number of said content data;
 (c) a source identification value;
 (d) a receiver identification value; and
 (e) a conditional access module identification value.

12. The apparatus according to claim 1, further comprising a copy protection and playback control device for:
 (a) receiving extracted watermark data from said output device;

(b) determining whether said extracted watermark data authorizes output of said decoded processed content data; and (c) if so, outputting an authorization to the output device.

13. The apparatus according to claim 1, wherein said output device further includes a display device and a watermark logic device, wherein said watermark logic device is operable to:

(a) extract a watermark from said decoded processed content data;

(b) create an extracted watermark data packet from said watermark;

(c) output said extracted watermark data packet to said conditional access module;

(d) input an authorization from said conditional access module; and (e) output an enable signal to said display device.

14. The apparatus according to claim 1, wherein said output device further includes:

(a) a video logic device for converting said decoded processed content data into a content signal; and (b) a display device for converting said content signal into a visual and/or audible form.

15. The apparatus according to claim 14, wherein said output device further includes an output fingerprint logic device for adding an output watermark to said content signal.

16. The apparatus according to claim 15, wherein said output watermark includes at least one of the following:

(a) a time of access of said content data;

(b) a serial number of said content data;

(c) a source identification value;

(d) a receiver identification value;

(e) a conditional access module identification value; and (f) a monitor identification value.

17. The apparatus according to claim 4, wherein said backend further includes a certifying and registering means for certifying and registering with the backend at least one device of the group consisting of: said source, said receiver, said conditional access module, and said output device.

18. An apparatus for secure distribution of content comprising:

(a) a source for accessing content data, said source including a transport packet generation device for transforming the content data into content data packets;

(b) a conditional access module for receiving the content data packets from said source and selectively processing the content data packets;

(c) a receiver for receiving the processed content data packets from said conditional access module and decoding the processed content data packets; and (d) an output device for outputting the decoded content data, wherein communications between the source, the receiver and the conditional access module utilize at least one packet data protocol.

19. A method of preventing unauthorized access to content data in a system comprising a source, a conditional access module, a receiver and an output device, the method comprising:

(a) acquiring content data at said source;

(b) transporting said content data to said conditional access module;

(c) determining whether access to said content data is authorized;

(d) selectively processing the content data;

(e) transporting processed content data from the conditional access module to said receiver;

(f) decoding the processed content data;

(g) selectively providing said decoded processed content data to said output device; and (h) outputting the decoded processed content data when authorized by said conditional access module.

20. The method according to claim 19, wherein the system is used with a backend, said method further comprising the step of registering and certifying with the backend at least one device of the group consisting of: said source, said receiver, said conditional access module, and said output device.

21. The method according to claim 19, wherein said source further comprises a transport packet generating device and said step of transporting said content data to said conditional access module further comprises the step of transforming the content data into content data packets using said transport packet generating device.

22. The method according to claim 21, wherein said receiver further comprises a transport packet demultiplexer and said step of transporting said content data to said conditional access module further comprises the step of unpacking said content data packets.

23. The method according to claim 19, the method further comprising the step of adding a CAM watermark to said content data, said CAM watermark including at least one of the following:

(a) a time of access of said content data;

(b) a serial number of said content data;

(c) a source identification value;

(d) a receiver identification value; and (e) a conditional access module identification value.

24. The method according to claim 19, wherein said system further comprises a copy protection and playback control device and wherein said step of determining whether access to said content data is authorized further comprises the steps of:

(a) transporting extracted watermark data from said output device to said copy protection and playback control device;

(b) determining whether said extracted watermark data authorizes said decoded processed content data for output; and (c) if so, outputting an authorization to the output device.

25. The method according to claim 19, wherein said output device further includes a display device and a watermark logic device and said step of outputting the decoded processed content data when authorized by said conditional access module further comprises the steps of:

(a) extracting a watermark from said decoded processed content data;

(b) determining whether said watermark is different from a predetermined watermark or if a predetermined amount of time has expired;

(c) if the watermark is determined to be different or said predetermined amount of time has expired:

(i) outputting said extracted watermark data to said conditional access module;

(ii) receiving an authorization from said conditional access module; and (iii) outputting an enable signal to said display device if authorized.

26. The method according to claim 19, wherein said step of outputting the decoded processed content data further includes:

(a) converting said decoded processed content data into a content signal; and (b) converting said content signal into a visual and/or audible form.

27. The method according to claim 26, the method further comprising the step of adding an output watermark to said content signal, said output watermark including at least one of the following:
   (a) a time of access of said content data;
   (b) a serial number of said content data;
   (c) a source identification value;
   (d) a receiver identification value;
   (e) a conditional access module identification value; and
   (f) a monitor device identification value.

28. The method according to claim 19, wherein said content data is encrypted and said step of selectively processing the content data further comprises the step of decrypting said encrypted content data.

29. The method according to claim 19, wherein said step of said transporting said content data to said conditional access module further comprises the steps of:
   (i) super encrypting said content data;
   (ii) transporting said content data to said conditional access module; and
   (iii) super decrypting the super encrypted content data.

30. The method according to claim 19, wherein said step of said transporting processed content data from the conditional access module to said receiver further comprises the steps of:
   (i) encrypting said processed content data;
   (ii) transporting encrypted processed content data to said receiver; and
   (iii) decrypting the decrypted processed content data.

31. A method of preventing unauthorized access to content data in a system comprising a source, a conditional access module, a receiver and an output device, the method comprising:
   a) acquiring content data at said source;
   b) transforming said content data into packet data;
   c) transporting said packet data from said source to said conditional access module;
   d) determining whether access to said packet data is authorized;
   e) selectively process said packet data;
   f) transporting said processed packet data to said receiver;
   g) decoding said processed packet data; and
   h) outputting the decoded content;
   wherein communications between the source, the receiver and the conditional access module utilize at least one packet data protocol.

* * * * *